United States Patent
Lim et al.

(10) Patent No.: US 8,750,361 B2
(45) Date of Patent: Jun. 10, 2014

(54) DEVICE AND METHOD FOR RECEIVING DOWNLINK SIGNAL IN WIRELESS COMMUNICATION SYSTEM

(75) Inventors: Chae Man Lim, Seoul (KR); Ho Il Kim, Yongin-si (KR); Young Min Ki, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 53 days.

(21) Appl. No.: 13/270,770

(22) Filed: Oct. 11, 2011

(65) Prior Publication Data

US 2012/0087406 A1 Apr. 12, 2012

(30) Foreign Application Priority Data

Oct. 11, 2010 (KR) .................. 10-2010-0098712

(51) Int. Cl.
*H03H 7/30* (2006.01)
*H04B 7/216* (2006.01)
*H04W 72/00* (2009.01)

(52) U.S. Cl.
USPC ..................... 375/229; 370/335; 455/450

(58) Field of Classification Search
USPC .......................... 375/229; 370/335
See application file for complete search history.

(56) References Cited

U.S. PATENT DOCUMENTS

| | | | | |
|---|---|---|---|---|
| 5,973,725 | A | * | 10/1999 | Lee ................................ 348/21 |
| 5,999,819 | A | * | 12/1999 | Khanna et al. ................ 455/450 |
| 6,112,092 | A | * | 8/2000 | Benveniste .................... 455/450 |
| 6,775,549 | B2 | * | 8/2004 | Benveniste ................ 455/452.1 |
| 2002/0176485 | A1 | * | 11/2002 | Hudson ......................... 375/144 |
| 2003/0118093 | A1 | * | 6/2003 | Bohnhoff et al. ............. 375/229 |
| 2004/0089798 | A1 | * | 5/2004 | Gruber et al. ................. 250/251 |
| 2004/0184514 | A1 | * | 9/2004 | Heo et al. ...................... 375/148 |
| 2005/0213543 | A1 | * | 9/2005 | Shimizu et al. ............... 370/335 |
| 2006/0269016 | A1 | * | 11/2006 | Long et al. .................... 375/340 |
| 2007/0280336 | A1 | * | 12/2007 | Zhang et al. .................. 375/148 |

* cited by examiner

*Primary Examiner* — Leon-Viet Nguyen
*Assistant Examiner* — Sarah Hassan
(74) *Attorney, Agent, or Firm* — The Farrell Law Firm, P.C.

(57) ABSTRACT

A device and method is provided for iterative inter-cell interference cancellation and channel equalization in the mobile communication system. A downlink receiver of a mobile communication system according to the present invention includes a channel estimator for estimating channel impulse response of a selected cell from channel signals of respective cells; an equalizer for equalizing the channel impulse response output by the channel estimator using an equalization coefficient; a despreader for generating a symbol observation value per code channel by despreading the output of the equalizer with a code of the selected cell; and a cell interference estimator for estimating a symbol signal power and noise power of a data code channel from the symbol observation value and generates the estimated MMSE as a chip level regeneration sample.

13 Claims, 6 Drawing Sheets
(1 of 6 Drawing Sheet(s) Filed in Color)

| beta update time point(in DSP) | | remark |
|---|---|---|
| | $\beta_k^\infty = \dfrac{Cellpower_k}{Cellpower_k + \sum_{i<k}(1-\beta_i^{\infty})Cellpower_i + \sum_{i>k}(1-\beta_i^{+\infty})Cellpower_i}$ for $k = 1, \ldots, N_{cell}$ | |
| Iteration 1, Cell before EQ calculation for 1 | $\beta_1^{(0)} = \beta_2^{(0)} = \beta_3^{(0)} = 0$ (initialization) | all Beta set to 0 |
| Iteration 1, Cell before EQ calculation for 2 | $\beta_1^{(1)} = \dfrac{P_1}{P_1 + P_2 + P_3}$ | |
| Iteration 1, Cell before EQ calculation for 3 | $\beta_2^{(1)} = \dfrac{P_2}{[1-\beta_1^{(1)}]^2 P_1 + P_2 + P_3}$ | |
| Iteration 2, Cell before EQ calculation for 1 | $\beta_3^{(1)} = \dfrac{P_3}{[1-\beta_1^{(1)}]^2 P_1 + [1-\beta_2^{(1)}]^2 P_2 + P_3}$ | |
| Iteration 2, Cell before EQ calculation for 2 | $\beta_1^{(2)} = \dfrac{P_1}{P_1 + [1-\beta_2^{(1)}]^2 P_2 + [1-\beta_3^{(1)}]^2 P_3}$ | |
| Iteration 2, Cell before EQ calculation for 3 | $\beta_2^{(2)} = \dfrac{P_2}{[1-\beta_1^{(2)}]^2 P_1 + P_2 + [1-\beta_3^{(1)}]^2 P_3}$ | |
| Iteration 3, Cell before EQ calculation for 1 | $\beta_3^{(2)} = \dfrac{P_3}{[1-\beta_1^{(2)}]^2 P_1 + [1-\beta_2^{(2)}]^2 P_2 + P_3}$ | |

FIG. 6

DEVICE AND METHOD FOR RECEIVING DOWNLINK SIGNAL IN WIRELESS COMMUNICATION SYSTEM

PRIORITY

This application claims priority under 35 U.S.C. §119(a) to an application filed in the Korean Intellectual Property Office on Oct. 11, 2010 and assigned Serial No. 10-2010-0098712, the entire disclosure of which is incorporated herein by reference.

BACKGROUND OF THE INVENTION

1. Field of the Invention

The present invention relates generally to an equalization device and method of a mobile communication system and, in particular, to a device and method for iterative inter-cell interference cancellation and channel equalization in the mobile communication system.

2. Description of the Related Art

Typically, a mobile terminal performs channel estimation for the serving cell and a predetermined number of interfering cells at a predetermined period (e.g. 512 Tc) in a mobile communication system. The mobile terminal calculates the equalization coefficient of the chip level equalizer for the serving cell with the channel estimation value of the serving cell and the recent channel estimation value of the interfering cell such that the chip level equalization coefficient is set as equalization filter coefficient. The equalizer performs chip level equalization operation with a predetermined number of samples input by an input sample buffer. After equalization, the serving cell performs descrambling and Orthogonal Variable Spreading Factor (OVSF) code despreading on the signal to be transmitted.

Such a conventional equalizer mitigates the interference by applying the channel estimation information of the interfering cell to the Minimum Mean Square Error (MMSE) chip equalization coefficient derivation process. That is, the conventional equalizer is used to mitigate rather than cancel the inter-cell interference completely and has a limit in the level of improvement of Signal-to-Interference-plus-Noise Ratio (SINR) and throughput.

SUMMARY OF THE INVENTION

In order to solve the above problems, embodiments of the present invention provide a device and method for improving SINR of the chip equalization output for a target cell with iterative inter-cell interference cancellation and chip level equalization in a mobile communication system. Specifically, the present invention includes a method for deriving a chip level equalization coefficient of a target cell through iterative interference cancellation process.

Moreover, the present invention provides an equalization method that performs chip equalization function on the cell having the strongest received signal strength, i.e., the serving cell, first. On the basis of the result of the equalization for the serving cell, the sample level regeneration is performed for the serving cell, and the chip level equalization for the cell having the next strongest received signal strength with the removal of the samples of the serving cell in the receive sample buffer (successive interference cancellation). With the iteration of this process, it is possible to improve the final SINR of the serving cell.

In accordance with an aspect of the present invention, a downlink receiver of a mobile communication system is provided, including a channel estimator for estimating channel impulse response of a selected cell from channel signals of respective cells; an equalizer for equalizing the channel impulse response output by the channel estimator using an equalization coefficient; a despreader for generating symbol observation value per code channel by despreading the output of the equalizer with a code of the selected cell; a cell interference estimator for estimating a symbol signal power and noise power of a data code channel from the symbol observation value and generates the estimated MMSE as chip level regeneration sample; and an interference canceller for connecting between an input node of the downlink receiver and the equalizer, buffering the output of the cell interference estimator to a regeneration sample buffer of the corresponding cell, subtracting a sum of regeneration samples of the interfering cells from the input sample signal to remove interference, and inputting a result of the subtraction to the equalizer.

In accordance with another aspect of the present invention, a cell interference cancellation method of a downlink receiver in a mobile communication system is provided, including estimating a channel impulse response of a cell selected from channel signals of respective cells; equalizing the channel impulse with an equalization coefficient; despreading the equalized output with a code of the selected cell to generate symbol observation value per code channel; estimating symbol level MMSE by measuring symbol signal power and noise power of data code channel from the symbol observation value to generate the estimated MMSE as chip level regeneration sample; and canceling interference by buffering a result of the cell interference estimation to a regeneration sample buffer of the corresponding cell, subtracting sum of regeneration samples of interfering cells from the input sample signal to cancel interference, and transferring a result of the subtraction for equalization.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts.

Although the description is made with reference to numerous specific details such as the number of antennas, Spreading Factor (SF), and number of iterations to provide a thorough understanding of embodiments of the present invention, those skilled in the art will appreciate that the present invention can be practiced without some or all of these specific details. Detailed descriptions of well-known functions and structures incorporated herein may be omitted to avoid obscuring the subject matter of the present invention.

The present invention relates to a device and method for updating iterative inter-cell interference, equalization, and equalization coefficient. Typically, the downlink receiver of a mobile communication system is equipped with a chip level equalizer, and the next generation mobile communication systems are required to use a more advanced receiver to meet the definition and performance requirements of Type2i (Interference aware chip level equalizer without rx diversity) and Type3i (Interference aware chip level equalizer with rx diversity). An embodiment of the present invention includes a method and apparatus for improving the SINR of the chip equalizer output of the desired cell through iterative inter-cell interference removal and chip level equalization (i.e., a serving cell) using the Type2i and Type3i as a basic chip level equalizer. In an embodiment of the present invention, a method and apparatus are provided for deriving the chip level equalization coefficient of the desired cell (i.e. serving cell) in consideration of the power reduction of the interfering cell through iterative interference removal process.

In order to achieve the above purpose, the downlink receiver, according to an embodiment of the present invention, can further include the MMSE scaling block per code channel, OVSF code spreader, primary code scrambler, channel estimation vector convolution module for storing the result in the regenerated sample buffer per cell, along with the Type2i and Type3i chip level equalizer.

The downlink receiver, according to an embodiment of the present invention, is provided with a chip level equalizer for inter-cell interference cancellation based on successive interference cancellation to update the equalization coefficient efficiently. For this purpose, the chip equalization is performed to the serving cell or the cell having the strongest signal strength, and then MMSE symbol estimation per OVSF code is performed. Sample level regeneration of the serving cell is then performed with the successive interference cancellation in the received sample buffer and then the chip level equalization is performed to the cell having the next strongest received signal strength. By performing the above-described process repeatedly, the SINR of the chip level equalizer output for the desired serving is improved. Since the inter-cell interference is partially removed at a Successive Interference Cancellation (SIC) state, the per-cell equalizer equalization coefficient calculator can derive the optimum equalization coefficient by reflecting this.

A description will now be made of a transmission/reception signal model according to an embodiment of the present invention. A description will also be made of estimating MMSE of the code channel symbol from the output of the code channel despreader and performing chip level code symbol unit estimation and interference removal based on the MMSE. Further, a description will be made of the method for updating equalization coefficient by deriving the coefficient of the chip equalizer after interference cancellation.

First, the transmission/reception signal mode according to an embodiment of the present invention is described hereinafter.

In multi-cell Wideband Code Division Multiple Access (WCDMA) downlink, the transmission signal of cell i (chip level) can be expressed as Equation (1):

$$x_i = s_i \sum_{k=1}^{SF} w_k g_{i,k} d_{i,k} = S_i W G_i d_i \text{ for } i = 1, \ldots, N_{Cell} \quad (1)$$

In Equation (1), SF denotes the spreading factor (e.g., SF=16 in 3GPP HSDPA), $N_{Cell}$ denotes a number of cells, $S_i$ denotes a primary scrambling code of cell i, $w_k$ denotes the $k^{th}$ OVSF code, $g_{i,k}$ denotes the code gain of $k^{th}$ OVSF code of cell I, and $d_{i,k}$ denotes the modulation symbol transmitted in $k^{th}$ OVSF code of cell i. $S_i$ is the matrix having the scrambling code sequences of length as diagonal elements, W is the matrix expressing the OVSF code, $G_i$ is the matrix having the per-code channel gains as diagonal elements, and $d_i$ is the column vector having the modulation symbols as many as SF as its elements.

The received signal sample vector (y) sampled in units of chips can be expressed as Equation (2):

$$y = H_1 x_1 + \sum_{j=2}^{N_{cell}} H_j x_j + \eta \quad (2)$$

$$H_j = \begin{bmatrix} h_{j,L-1} & \cdots & h_{j,0} & 0 & 0 & 0 \\ 0 & h_{j,L-1} & \cdots & h_{j,0} & 0 & 0 \\ \vdots & \vdots & \ddots & \ddots & \ddots & \vdots \\ 0 & 0 & 0 & h_{j,L-1} & \cdots & h_{j,0} \end{bmatrix}.$$

In Equation (2), ($h_{j,0}, \ldots, h_{j,L-1}$) denotes the chip level channel response right after the primary scrambling operation of cell j to the chip level sampling time point of the terminal, L ($>0$) denotes the channel response length, and it is assumed that all the cell have the same value of L for the convenience purpose.

The initial Linear Minimum Mean Square Error (LMMSE) chip signal estimation for cell i can be expressed as Equation (3):

$$\hat{x}_i = W_{eq,i} y = C_{x_i} H_i^H \left( H_i C_{x_i} H_i^H + \sum_{j=i}^{N_{cell}} H_j C_{x_j} H_j^H + \sigma_\eta^2 I \right)^{-1} \cdot y \quad (3)$$

In Equation (3), $W_{eq,1}$ denotes the chip level equalization coefficient vector for cell i with definition of $C_{x_i}=E[x_i x_i^H]$ and corresponds to the transmission chip power of cell i in meaning. E[.] denotes the ensemble average, H denotes a hermitian matrix, and I denotes the identity matrix. The equivalent relationship of $C_{x_i}=tr(G_i^2)$ for i=1, . . . , $N_{Cell}$ can be proven.

Hereinafter, a description will be made of the output of the code channel despreader.

Through OVSF code de-channelization per code channel of SF (e.g., 16, 128, etc.) after performing descrambling on the output of the chip level equalizer with the primary scrambling code of the cell, the modulation symbol estimation value is derived.

It is assumed that the chip output model of the chip level equalization for cell i (here, the serving cell) is expressed by Equation (4):

$$\hat{x}_i = W_{eq,i} y = x_i + n_i, \ n_i \sim CN(0, \sigma_i^2), \ \sigma_i^2 = 1/(Ior/Ioc) \quad (4)$$

In Equation (4), $CN(0,\sigma^2)$ denotes a circularly symmetric complex Gaussian noise probability variable having an average of 0 and a standard deviation of $\sigma^2$, and Ior/Ioc denotes the geometry of the recipient terminal. In Equation (4), it is assumed that the multipath channel effect is removed by the chip level equalizer such that the chip level equalizer output signal model is identical with AN Additive White Gaussian Noise (AWGN) model for the purpose of simplification.

The Common Pilot CHannel (CPICH) symbol observation value generated in units of 512 chips by the recipient terminal of the 3GPP downlink according to an embodiment of the present invention can be expressed as Equation (5):

$$c_{i,cpich} = g_{i,cpich}\frac{1+j}{\sqrt{2}} + n_{i,cpich}, n_{i,cpich} \sim CN(0, \sigma^2_{i,cpich}) \quad (5)$$

In Equation (5), $(1+j)/\sqrt{2}$ denotes a CPICH symbol of the 3GPP Standard, and $g_{i,cpich}$ denotes the reception gain of CPICH. The following relationship is derived: $\sigma_{i,cpich}^2 = \sigma_i^2/512$.

The per-code channel symbol observation value of a specific SF can be expressed by Equation (6) and can be implemented through well-known Inverse Fast Hadamard Transform (IFHT) with low computation complexity.

$$c_{SF,i} = W^T S_i^H \hat{x}_i \quad (6)$$

In Equation (6), T denotes the matrix transpose. Through the above process, the symbol observation of the $k^{th}$ code channel is derived as Equation (7):

$$c_{SF,i,k} = g_{SF,i,k} d_{i,k} + n_{SF,i,k}, n_{SF,i,k} \sim CN(0,\sigma_{SF,i}^2),$$
$$k = 1, \ldots, SF-1 \quad (7)$$

In Equation (7), $d_{i,k}$ denotes the modulation symbol (QPSK, 16-QAM, 64-QAM) transmitted on the $k^{th}$ code channel, and $g_{SF,i,k}$ denotes the gain of the $k^{th}$ code channel. The following relationship is derived: $\sigma_{SF,i}^2 = \sigma_i^2/SF$. Accordingly, a relationship of $\sigma_{SF,i}^2 = \sigma_i^2/SF$ is established.

Since the method for estimating the aforementioned $g_{i,cpich}$, $g_{SF,i,k}$, $\sigma_{i,cpich}^2$ and $\sigma_{SF,i}^2$ is well known, a setailed description thereon is omitted herein.

A description will now be made of the method for estimating MMSE of the code channel symbol.

As aforementioned, it is assumed that the symbol observation value of the $k^{th}$ code channel of a specific SF (=16, 128, etc.) is expressed as Equation (8):

$$c_{SF,i,k} = g_{SF,i,k} d_{i,k} + n_{SF,i,k}, n_{SF,i,k} \sim CN(0,\sigma_{SF,i}^2),$$
$$k = 1, \ldots, SF-1 \quad (8)$$

The symbol level LMMSE estimation to the modulation symbol $d_{i,k}$ can be derived as Equation (9):

$$\hat{d}_{i,k} = \frac{\hat{g}_{SF,i,k}}{\hat{g}^2_{SF,i,k} + \hat{\sigma}^2_{SF,i}} c_{SF,i,k}. \quad (9)$$

Accordingly, the estimation to $g_{SF,i,k} d_{i,k}$ can be derived as Equation (10):

$$\hat{g}_{SF,i,k}\hat{d}_{i,k} = \frac{\hat{g}^2_{SF,i,k}}{\hat{g}^2_{SF,i,k} + \hat{\sigma}^2_{SF,i}} c_{SF,i,k}. \quad (10)$$

A description will now be made of the chip level code symbol unit estimation method and interference cancellation method.

After summing the chips on which OVSF channelization for all of code channel k (having a meaningful code channel gain as compared to CPICH gain) found for cell i, the primary scrambling code is multiplied. This can be expressed as Equation (11):

$$\hat{\hat{x}}_i = S_i \sum_{k=1}^{SF} w_k \hat{g}_{SF,i,k} \hat{d}_{i,k} = S_i W \hat{G}_i \hat{d}_i. \quad (11)$$

In Equation (11), $\hat{\hat{x}}_i$ denotes estimation of transmission chip sequence of the cell enhanced with symbol level MMSE estimation, $\hat{G}_i$ denotes the estimation matrix to $G_i$, and $\hat{d}_i$ denotes the estimation vector to $d_i$.

By performing convolution with an FIR filter having the channel estimation value of cell i, the received chip signal of cell i is regenerated and stored in the regenerated signal buffer of cell i. This can be expressed as Equation (12):

$$\hat{y}_i = \hat{H}_i \hat{\hat{x}}_i \quad (12).$$

In Equation (12), $\hat{y}_i$ denoted estimation to the received chip signal of cell I and $\hat{H}_i$ denotes the estimation matrix to $H_i$.

In order to perform MMSE chip equalization to another cell j ($\neq$i), the received chip signals of all the cells i ($\neq$j) which are regenerated until then should be read out to be deleted from the regenerated signal buffer while reading the input sample buffer according to the basic principle of successive interference cancellation. This can be expressed as Equation (13):

$$y - \sum_{i \neq j}^{N_{cell}} \hat{y}_i. \quad (13)$$

According to the initial conditions, the received chip signals of the cell i ($\neq$) that are not regenerated yet in the above Equation are regarded as 0.

A description will now be made of deriving the chip equalizer coefficient after interference cancellation.

In the case in which the MMSE chip equalization of a specific cell in the input sample to which a plurality cell signals are added is performed, if the signal sample estimation value of other interfering cells are excluded, this means that a certain amount of power of the interference signals are subtracted, such that the MMSE chip equalization derivation method can be designed in consideration of this.

First of all, an equation such as Equation (14) is used.

$$C_{x_i} = tr(G_i^2) \text{ for } i=1, \ldots, N_{Cell} \quad (14).$$

In addition, the approximation is assumed as shown in Equation (15):

$$H_i H_i^H \cong E[H_i H_i^H] = E\left[\sum_{l=0}^{L-1} |h_i(l)|^2\right] \cdot I \text{ for } i=1, \ldots, N_{Cell}. \quad (15)$$

With these Equations, the first stage LMMSE chip signal estimation $\hat{x}_i$ for cell i can be approximated as shown in Equation (16):

$$\hat{x}_i = W_{eq,i} y = C_{x_i} H_i^H \left( H_i C_{x_i} H_i^H + \sum_{j \neq i}^{N_{cell}} H_j C_{x_j} H_j^H + \sigma_\eta^2 I \right)^{-1} \cdot y \approx tr(G_i^2) \quad (16)$$

$$H_i^H \left( tr(G_i^2) E\left[\sum_{l=0}^{L-1} |h_i(l)|^2\right] \cdot I + \sum_{j \neq i}^{N_{cell}} tr(G_j^2) E\left[\sum_{l=0}^{L-1} |h_j(l)|^2\right] \cdot I + \sigma_\eta^2 I \right)^{-1}$$

-continued $$\left( \sum_{k=1}^{N_{cell}} H_k x_k + \eta \right).$$

The signal $\hat{\hat{x}}_i$ regenerated at the chip level through the symbol MMSE estimation, OVSF channelization, and primary scrambling processes is regarded as the signal in which a significant amount of other cell components is removed and thus can be approximated as shown in Equation (17):

$$\hat{\hat{x}}_i \approx tr(G_i^2) \quad (17)$$

$$H_i^H \left( tr(G_i^2) E\left[\sum_{l=0}^{L-1} |h_i(l)|^2\right] \cdot I + \sum_{j \neq i}^{N_{cell}} tr(G_j^2) E\left[\sum_{l=0}^{L-1} |h_j(l)|^2\right] \cdot I + \sigma_\eta^2 I \right)^{-1}$$

$$H_i x_i =$$

$$\frac{tr(G_i^2) E\left[\sum_{l=0}^{L-1} |h_i(l)|^2\right]}{tr(G_i^2) E\left[\sum_{l=0}^{L-1} |h_i(l)|^2\right] + \sum_{j \neq i}^{N_{cell}} tr(G_j^2) E\left[\sum_{l=0}^{L-1} |h_j(l)|^2\right] + \sigma_\eta^2} x_i = \beta_i x_i.$$

Assuming $$E\left[\sum_{l=0}^{L-1} |h_i(l)|^2\right] \approx 1 \text{ for } i = 1, \ldots, N_{cell},$$

Equation (18) is derived.

$$\beta_i \approx \frac{tr(G_i^2)}{tr(G_i^2) + \sum_{j \neq i}^{N_{cell}} tr(G_j^2) + \sigma_\eta^2} \text{ for } i = 1, \ldots, N_{cell}. \quad (18)$$

In Equation (18), it is shown that $\beta_i$ is approximate to the geometry value of cell i.

The above process is applied for a certain cell and a certain iteration procedure. Here, the calculation is performed in unit of row in Table 1 and in ascending order within a row (it is assumed that the lower the cell index is, the stronger the signal strength of the cell is).

TABLE 1

| Iteration | Cell i < k | Cell k | Cell i > k |
|---|---|---|---|
| m − 1 | | | |
| m | | $\hat{x}_k^{(m)}$, $\beta_k^{(m)}$ | |
| m + 1 | | | |

Reflection the condition in that, at the $m^{th}$ iteration, the successive interference cancellation process is performed in order from cell 1 to cell $N_{cell}$, the input sample $y_k$ of the MMSE chip equalizer of $k_{th}$ cell can be expressed as Equation (19) (if the first iteration m=1, $\beta_i^{(0)}=0$, $\hat{x}_i^{(0)}=0$ for i=1, ..., $N_{cell}$ in the inductive equation below).

$$y_k = y - \left( \sum_{i<k} H_i \hat{x}_i^{(m)} + \sum_{i>k} H_i \hat{x}_i^{(m-1)} \right) \approx \quad (19)$$

$$H_k x_k + \sum_{i<k} (1 - \beta_i^{(m)}) H_i x_i + \sum_{i>k} (1 - \beta_i^{(m-1)}) H_i x_i$$

In the $m^{th}$ iteration, the Minimum Mean Square Error (MMSE) chip signal estimation $\hat{x}_k^{(m)}$ of $k^{th}$ cell is expressed as Equation (20):

$$\hat{x}_k^{(m)} = \quad (20)$$

$$W_{eq,k}^{(m)} y_k \approx tr(G_k^2) H_k^H \left( tr(G_k^2) H_k H_k^H + \sum_{i<k} (1 - \beta_i^{(m)})^2 tr(G_i^2) H_i H_i^H + \right.$$

$$\left. \sum_{i>k} (1 - \beta_i^{(m-1)})^2 tr(G_i^2) H_i H_i^H + \sigma_\eta^2 I \right).$$

In Equation (20), $W_{eq,k}^{(m)}$ denotes the chip level equalization coefficient vector of the $m^{th}$ iteration for cell k.

Likewise, Equation (21) can be derived.

$$\hat{\hat{x}}_k^{(m)} = \beta_k^{(m)} x_k \quad (21)$$

-continued $$\beta_k^{(m)} \approx \frac{tr(G_k^2)E\left[\sum_j |h_k(j)|^2\right]}{tr(G_k^2)E\left[\sum_j |h_k(j)|^2\right] + \sum_{i<k}(1-\beta_i^{(m)})^2 tr(G_i^2)E\left[\sum_j |h_i(j)|^2\right] + \sum_{i>k}(1-\beta_i^{(m-1)})^2 tr(G_i^2)E\left[\sum_j |h_i(j)|^2\right] + \sigma_\eta^2}.$$

Likewise, assuming $$E\left[\sum_{l=0}^{L-1}|h_i(l)|^2\right] \approx 1 \text{ for } i = 1, \ldots, N_{cell},$$

Equation (22) can be derived.

$$\beta_k^{(m)} \approx \frac{tr(G_k^2)}{tr(G_k^2) + \sum_{i<k}(1-\beta_i^{(m)})^2 tr(G_i^2) + \sum_{i>k}(1-\beta_i^{(m-1)})^2 tr(G_i^2) + \sigma_\eta^2} \quad (22)$$

for $k = 1, \ldots, N_{cell}$.

This can be summarized by approximating as Equation (23):

$$\beta_k^{(m)} \approx \frac{CellPower_k}{CellPower_k + \sum_{i<k}(1-\beta_i^{(m)})^2 CellPower_i + \sum_{i>k}(1-\beta_i^{(m-1)})^2 CellPower_i} \quad (23)$$

for $k = 1, \ldots, N_{cell}$.

In Equation 23, $CellPower_k$ denotes transmission chip power of cell k.

Through the approximated equation derivation process, it is possible to calculate the chip level equalization coefficient vector $W_{eq,k}^{(m)}$ with $CellPower_k$ and reflective $\beta_k^{(m)}$. The iterative successive interference cancellation and the process for calculating the weight $W_{eq,k}^{(m)}$ for the chip equalizer of iterative successive interference cancellation can be implemented easily and creatively due to the necessity of only the power estimation of the chip signal per cell.

The procedure for estimating the MMSE of the code channel symbol from the despread output of the code channel, estimating the chip level code symbol and removing interference using the MMSE, and updating the coefficient by deriving the chip equalizer coefficient after canceling the interference according to a present invention will now be described with reference to accompanying drawings.

Figure 1:
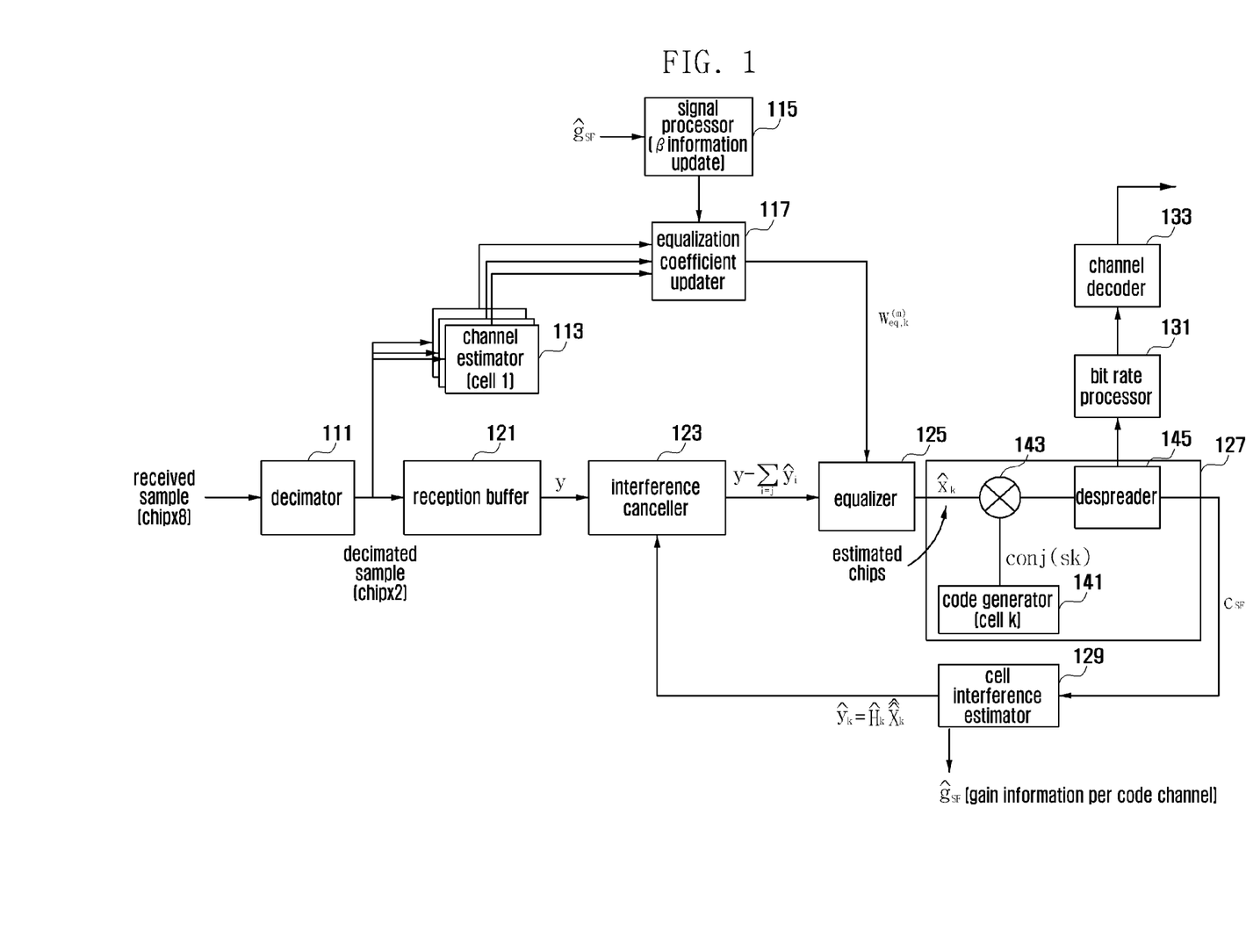
FIG. 1 is a block diagram illustrating a configuration of a downlink receiver of a mobile communication system according to an embodiment of the present invention.

FIG. 1 is a block diagram illustrating a configuration of a downlink receiver of a mobile communication system according to an embodiment of the present invention. The downlink receiver is provided with a configuration for performing iterative inter-cell interference cancellation and equalization function in the Interference-aware equalizer with no RX diversity (Type2i)/Interference-aware equalizer with RX diversity (Type3i). With this configuration, the device is the successive interference canceller equipped with the normal chip level equalizer (Type2i/Type3i) as basic receiver.

Referring to FIG. 1, the decimator 111 performs decimation at a predetermined sample rate. It is assumed that 8 samples are received per sample and the decimator 111 performs decimation on the samples at a CHIPX2 (fractional spaced equalizer) or CHIPX1 (chip spaced equalizer) rate. The decimated samples are buffered in the received sample buffer 121 having a predetermined size. Here, the reason the received sample buffer 121 buffers (i.e. delays) the samples is to have a double buffer structure for compensating the delay caused by the channel estimator 113 and the delay caused by the interference cancellation process.

The interference canceller 123 stores the regenerated samples of the cells that are regenerated by the signal regenerator 129 and cancels the interference by subtracting the sum of the regenerated samples corresponding to the interfering cells of the samples output by the reception buffer 121 from the received samples under the control of the IC controller (not shown). That is, the interference canceller 123 subtracts the sum of the regenerated samples of interfering cells that are buffered per cell from the regenerated sample while reading the input samples in a predetermined size so as to cancel the interference components of the received sample. The interference canceller 123 can be configured as described with reference to FIG. 3.

The channel estimator 113 can be provided for the number base stations with which the channel estimation is possible and estimates the channel response of the cell corresponding to the sample (decimated sample) output by the decimator 111. That is, while the received samples are buffered in the reception buffer 121, each channel estimator 113 estimates the channel impulse response per cell independently and outputs the channel estimation result to the equalization coefficient updater 117 at a predetermined period. It is assumed that $N_{cell}$ channel estimator 113 processes a plurality of channels simultaneously.

The chip level equalization coefficient updater 117 calculates the chip equalization coefficient with the channel impulse response per cell output by the channel estimator 113 and the beta value (β) provided by the signal processor 115 and then outputs the chip equalization coefficient to the equalizer 125. The equalization coefficient updater 117 calculates the chip equalization coefficient suitable for the cell (cell k selection signal output by the IC controller) of which the channel impulse response is chip-equalized and outputs the chip equalization coefficient to the equalizer 125 periodically.

The equalizer 125 equalizes the sample from which the interference is canceled by the interference canceller 123 using the equalization coefficient of the corresponding cell which is output by the equalization coefficient updater 117 and outputs the equalized sample. The equalizer 125 can be provided with an EQ FIR filter. The equalizer 125 is responsible for the equalization function by performing FIR filtering on the sample from which interference is canceled by the interference canceller 123.

The despreading part 127 performs despreading on the samples output by the equalizer 125 and generates the symbol observation values. The code generator (conjugate of cell k scrambling code generator) 141 generates scrambling code $conj(s_k)$. The multiplier 143 multiplies the output of the equalizer 125 and the output of the code generator 141, and the despreader (OVSF despreader) performs despreading on the output of the multiplier 143. That is, the despreading part 127 performs compensation for the chip level-equalized output samples with the primary scrambling code that is performed by the normal WCDMA downlink receiver and performs OVSF despreading to obtain the demodulation symbol observation value per code channel. The demodulation symbol observation values are obtained per code channel (e.g., in the case of SF=16, 1 pilot channel and 15 data code channels) through OVSF despreading.

Figure 2:
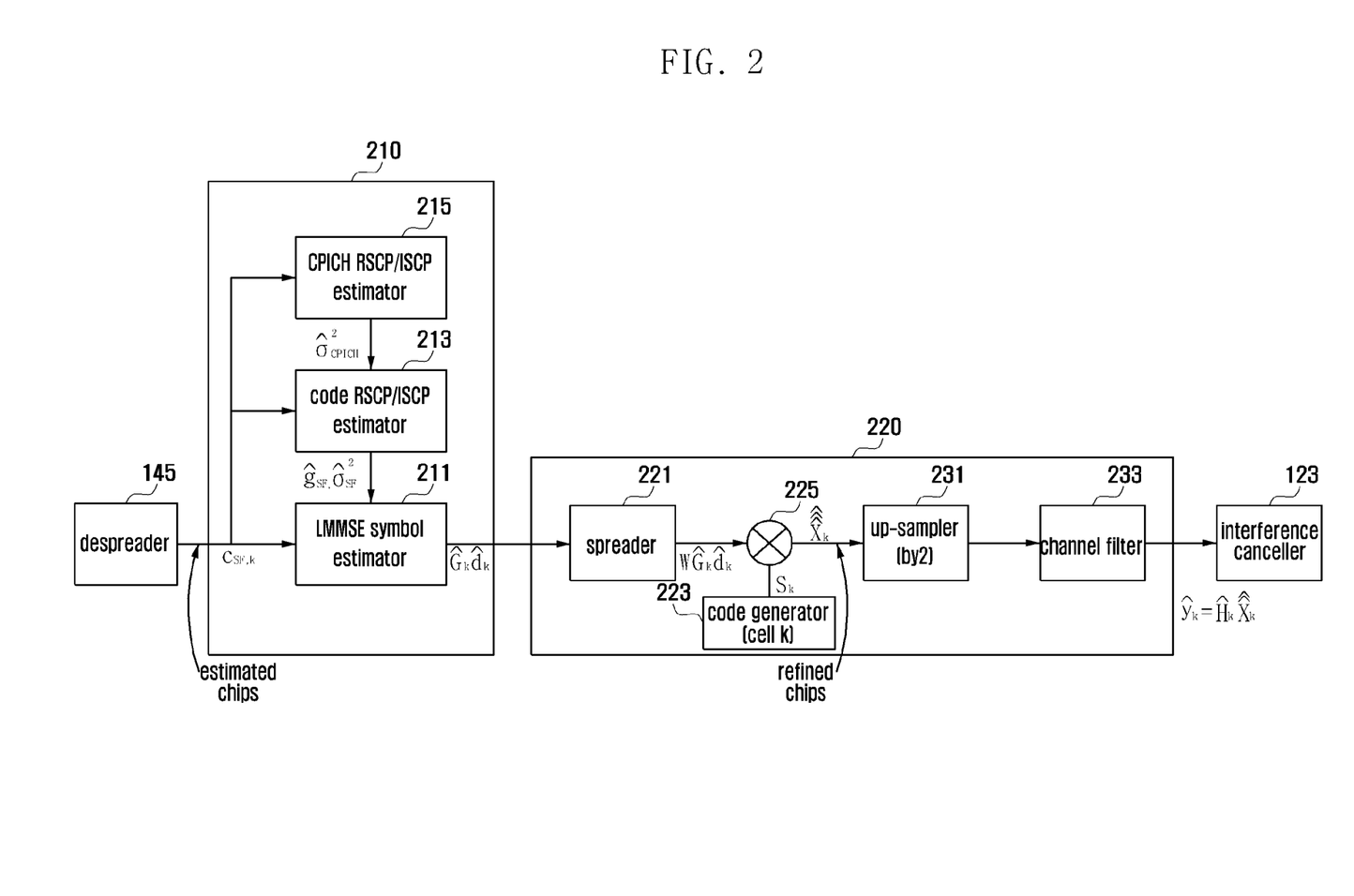
FIG. 2 is a block diagram illustrating a configuration of the cell interference estimator of FIG. 1.

The cell interference estimator 129 receives the demodulated symbol observation values output by the despreading part 127, calculates the per code channel gain information $g_{SF}$ by estimating the symbol level MMSE, outputs the MMSE to the signal processor 115, and generates the regeneration sample by estimating the chip level received signal from the symbol level MMSE. The cell interference estimator 129 can be configured as shown in FIG. 2.

The cell interference estimator 129 measures the code power and noise power using the moving average or Infinite Impulse Response (IIR) filter per code and then performs MMSE symbol estimation for code channel symbols. The cell interference estimator 129 then performs OVSF spreading on the MMSE symbol estimation value per code channel, adds the result to all the codes, and performs chip level multiplication with the scrambling code of the cell. The cell interference estimator 129 performs FIR filtering (convolution) with the channel estimation vector to regenerate the received chip sample of the cell and transfers the regenerated sample to the interference canceller 123.

The signal processor (e.g., a Digital Signal Processor (DSP)) 115 receives the per-code channel gain information $g_{SF}$ from the cell interference estimator 129. The signal processor 115 receives all the code channel gains of the desired cell from the cell interference estimator 129 and performs suitable processing (e.g. summation) to estimate the transmission power of the cell (cell power). All the estimated cell power values are input to the chip level equalization coefficient updater 117 so as to be reflected in the chip level equalization coefficient calculation process for the cell to be processed.

The Integrated Circuit (IC) controller (not shown) is the function block responsible for IC ordering (determining the processing order of $N_{cell}$ cells according to a predetermined rule), timing management (managing all the timings related to the IC such as IC core and DSP, and received sample buffer input and output), and stop condition management (managing start/stop of IC operation by checking the start/stop condition of IC operation). In an embodiment of the present invention, the interference cancellation controller compares the power values of the channel estimation vectors measured per cell and sorts out the power values in descending order. The interference cancellation controller also configures the number of cells to participate in the iterative interference cancellation process and the number of iterations in consideration of the signal strengths of interfering cells, battery power level of the terminal modem, or QoS level. The interference cancellation controller also selects the cells of which interference cancellation and chip equalization coefficient are calculated and the buffer for buffering the regenerated samples. The interference cancellation controller also stops the iterative interference cancellation process when the number of iterations reaches the predetermined maximum number of iterations. This can be implemented in hardware or as a task in the DSP.

If the iterative interference cancellation process is terminated by the interference cancellation controller, the bit rate processor 131 and channel decoder 133 receive the inter-cell interference canceled signals output by the despreading part 127 to perform the process of the downlink receiver.

FIG. 2 is a block diagram illustrating a configuration of the cell interference estimator 129 of FIG. 1.

Referring to FIG. 2, the cell interference estimator 129 includes a symbol estimator 210 and a regenerated sample generator 220 to estimate the interference component of the cell selected by the interference cancellation controller and to generate the regeneration sample. The symbols of the channels output by despreader 145 are transferred to the CPICH symbol estimator 215, code symbol estimator 213, and LMMSE symbol estimator 211, respectively. The pilot channel symbol observation value is supplied to the CPICH symbol estimator 215 as the CPICH Received Signal Code Power (RSCP)/Interference Signal Code Power (ISCP) Estimation block so as to be used for noise power (ISCP) estimation of the CPICH. The data code channel demodulation symbol observation value is input to the code symbol estimator 213 as the SF=16 data code channel RSCP/ISCP estimation block, and code symbol estimator 213 as the data code channel RSCP/ISCP estimation block uses the CPICH ISCP information input by the CPICH symbol estimator 215 as the CPICH ISCP estimation block to calculate and output the signal power (RSCP) and noise power (ISCP) per data code channel. The LMMSE symbol estimator 211 of the LMMSE symbol estimation block performs LMMSE symbol estimation on the demodulation symbol using the RSCP/ISCP information input by the code channel RSCP/ISCP estimation block and then outputs the value obtained by multiplying the symbol gain of the code channel that is output by the code symbol estimator 213.

The symbol level MMSE estimation value output by the symbol estimator 210 is input to the regeneration sample generator 220. The spreader 211 of the OVSF spreading block performs OVSF spreading as the WCDMA downlink transmitter performs to the respective code channels found (having the code gain greater than or equal to a predetermined size) to convert the input symbol to chip. The code generator 223 generates the scrambling code of the corresponding cell under the control of the interference cancellation controller (not shown). The multiplier 225 multiplies the chips output by the spreader 221 with the primary scrambling code sequence of the cell (processed cell k) that is output by the code generator 223. The up-sampler 231 performs up-sampling on the chip (scrambled chip) sequence, and the channel filter 233 performs convolution with the FIR filter with the channel estimation vector of the cell to generate the estimation vector to the received sample of the cell.

Figure 3:
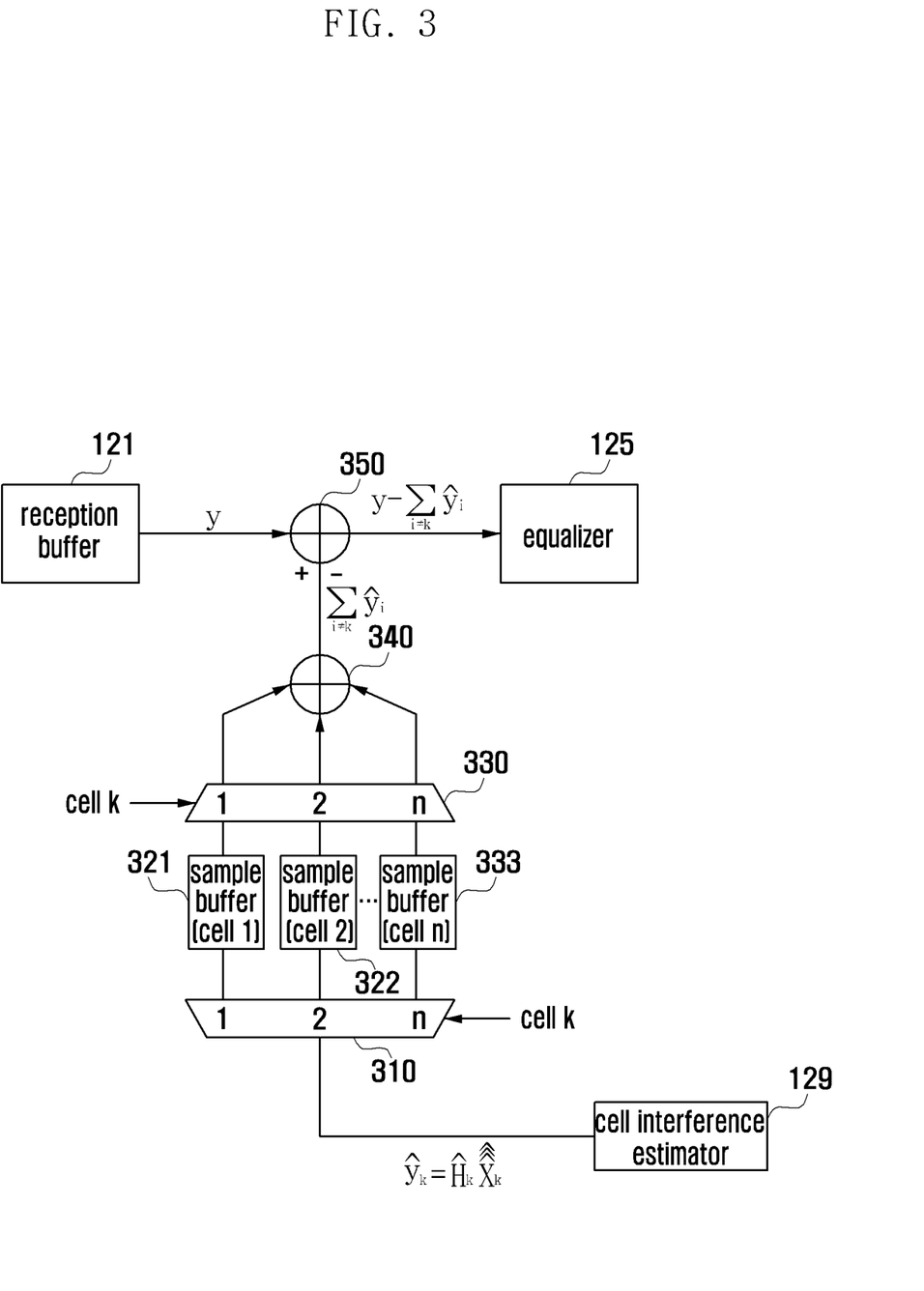
FIG. 3 is a block diagram illustrating a configuration of the interference canceller of FIG. 1.

FIG. 3 is a block diagram illustrating a configuration of the interference canceller 123 of FIG. 1.

Referring to FIG. 3, the first selector 310 selects the regeneration sample buffer for buffering the regeneration samples output by the cell interference estimator 129 according to the cell selection signal cell k output by the cell interference controller (not shown) and transferring the regeneration samples to the selected regeneration sample buffer. The number of regeneration sample buffers 321 to 32$n$ are provided for as many as the number of the cells for which the cell interference is estimated (in this case, n), and the regeneration sample buffer of the corresponding cell is selected under the control of the first selector 310 to buffer the regeneration samples of the corresponding cells that are output by the cell interference estimator 129. The second selector 330 selects the regeneration sample buffer for buffering the regeneration samples of the corresponding cell among the regeneration sample buffers 321 to 32$n$ according to the cell selection signal cell k output by the interference cancellation controller (not shown) and outputs the regeneration samples corresponding to the interfering cells selectively among the regeneration samples per cell. The adder 340 sums the regeneration samples of the interfering cells that are output by the second selector 330. The adder 350 adds the regeneration sample of the selected cell that is output by the adder 340 to the received sample output by the reception buffer 121 to remove the cell interference from the received sample.

Figure 4:
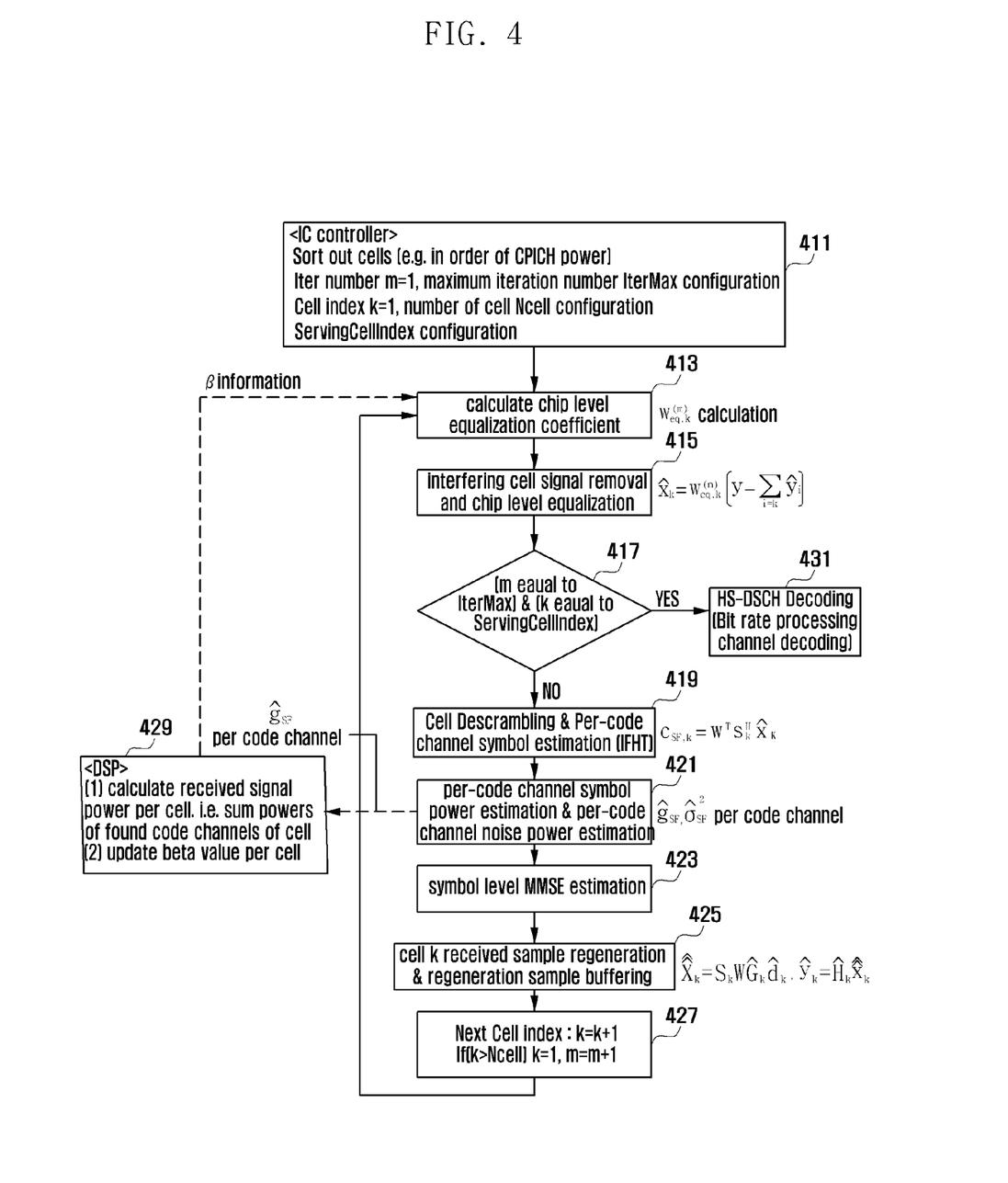
FIG. 4 is a flowchart illustrating a procedure for iterative interference cancellation and equalization in the downlink receiver according to an embodiment of the present invention.

FIG. 4 is a flowchart illustrating a procedure for iterative interference cancellation and equalization in the downlink receiver according to an embodiment of the present invention. In the following description, the operation of the iterative interference cancellation and chip level equalization device is described first and then the equalization coefficient update operation of the iterative cancellation and chip level equalization device is described.

In association with the operations of the iterative interference cancellation and chip level equalization device, FIG. 4 shows the procedure for iterative interference cancellation and chip level equalization in a predetermined size of a received sample block (e.g. 512 chips or 1024 chips). The interference cancellation controller (not shown) compares the power values of the channel estimation vectors of the respective cells to sort out the cells in descending order in step 411. The cells can be arranged by CPICH power level. The interference cancellation controller configures the number of cells to be joined in the iterative interference cancellation process (Ncell) and the maximum number of iterations (IterMax) (e.g., Ncell=2-3, IterMax=1-3). The interference cancellation controller then initializes the number of iterations IterMax (m=1) and the next cell index (k=1) in order to perform the cell interference cancellation and equalization coefficient update process.

The signal processor 115 of FIG. 1 and equalization coefficient calculator 117 of FIG. 1 then calculate the equalization coefficient $W_{eq,k}^{(m)}$ with the gain information input per code channel of cell k in step 413. The interference is not canceled yet in the initial state (first iteration m=1) but is canceled from the next state. The interference canceller 123 of FIG. 1 and the equalizer 125 of FIG. 1 perform chip level equalization while removing the samples of the interfering cells except cell i from the received sample in step 415. That is, the interference canceller 123 of FIG. 1 removes the samples of the interfering cells, excluding cell i, from the received samples, and the equalizer 125 of FIG. 1 performs chip level equalization on the interference-removed samples with the equalization coefficient updated by the equalization coefficient calculator 117 of FIG. 1. The output of the equalizer 125 becomes $$\hat{x}_k = W_{eq,k}^{(m)}\left(y - \sum_{i=k} \hat{y}_i\right).$$

After the equalization process, the interference cancellation controller compares the current iteration number (m) with the maximum number of iterations (IterMax) and, if the current iteration number (m) is greater than IterMax, stops the iterative interference cancellation process. The despread symbols output by the despreader 145 of FIG. 1 are in the state that the cell interference is removed, and the interference cancellation controller controls the despreading part 127 of FIG. 1 to output the despread symbols to the bit rate processor 131 of FIG. 1 and the channel decoder 133 of FIG. 1 such that the normal operations (descrambling, OVSF despreading, etc. and channel decoding) are performed thereon. That is, while the interference cancellation operation is repeated a predetermined number of iteration times, the interference cancellation controller controls the symbol processing of the downlink receiver. However, if the current iteration number is not greater than IterMax, the interference cancellation controller controls to continue the iterative interference cancellation process in step 419.

In step 419, the despreading part 127 of FIG. 1 performs despreading on the signal of the cell for estimating interference to the signal from the equalizer so as to output the despread signal $c_{SF,k} = W^T S_k^H \hat{x}_k$. That is, the despreading part 127 of FIG. 1 performs cell descrambling and OVSF despreading in step 419. The despreading operation can be performed per code channel such as SF=16 (HS-DSCH), SF=128 (DPCH, CommonChannel), and SF=256 (CommonChannel), without restriction. The symbol estimator 210 of the cell interference estimator 129 performs code power estimation and noise power estimation ($\hat{g}_{SF}, \sigma_{SF}^2$) per code channel in step 421. The code and noise powers of the code channel can be estimated using the moving average or using an IIR filter. The LMMSE symbol estimator 211 of FIG. 2 of the cell interference estimator 129 of FIG. 1 then perform the MMSE symbol estimation on the code channel symbol using the code power and noise estimation results per code channel in step 423. The MMSE symbol estimation can be performed using the method well-known in the art, and thus a detailed description thereof is omitted herein. Afterward, the regeneration sample generator 220 of the cell interference estimator 129 performs OVSF spreading on the MMSE symbol estimation value per code channel again, adds the spread signal per code channel, performs chip level multiplication with scrambling code of the cell ($\hat{x}_k = S_k W \hat{G}_k \hat{d}_k$), and performs FIR filtering (i.e., convolution) with the channel estimation vector so as to regenerate the received chip sample of the cell ($\hat{y}_k = \hat{H}_k \hat{x}_k$) in step 425. The regeneration sample is stored in the regeneration sample buffer of the cell corresponding to the interference canceller 123 of FIG. 1.

After storing the regeneration sample of the cell, the interference cancellation controller designates the cell variable, i.e. the next cell index (k) (k=k+1) in step 427. If the current cell variable k is equal to the last cell (Ncell) index, i.e., the regeneration is performed for all the cells, the interference cancellation controller increments the Iter variable (m), i.e., the number of iterations (If k>Ncell, k=1 and m=m+1), to perform the next iteration.

Figure 5:
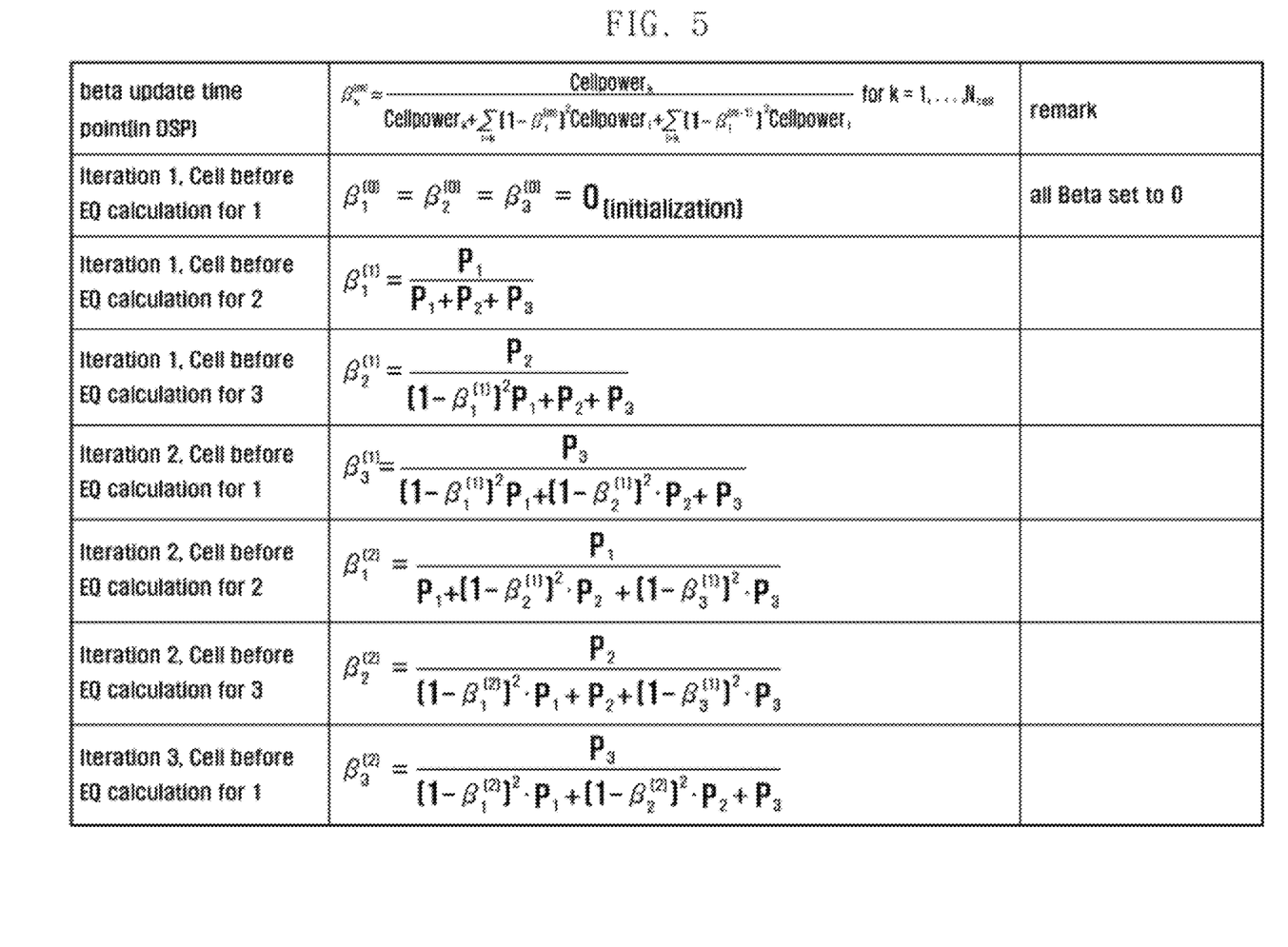
FIG. 5 is diagram illustrating a table showing an case of equalization coefficient update according to an embodiment of the present invention.

A description will now be made of the iterative interference cancellation and the equalization coefficient update process of the chip level equalizer with reference to FIG. 4. The iterative interference cancellation and equalization coefficient update process of the chip level equalizer are depicted with dotted lines in FIG. 4. The estimated code channel powers of the code channels of the cells are transferred to the signal processor 115 of FIG. 1 in step 421. The signal processor 115 calculates the power of the received signal per cell (i.e., summation of the powers of found code channels of the cells) and updates the beta value of each cell. That is, the signal processor 115 updates the per-cell received signal power and beta information $\beta_k^{(m)}$ in step 429. The equalization coefficient calculator 117 of FIG. 1 calculates the chip equalization coefficient (EQ weight) in consideration of the received signal power of interfering cells based on the information output by the signal processor 115 ($\beta_k^{(m)}$ and per-cell channel estimation information) in step 429. The above description is directed to a case where Ncell=1, IterMax=3, Serving Cell Index=1 as summarized in the table of FIG. 5, in order to help explain the $\beta_k^{(m)}$ calculation process. In FIG. 5, P1, P2, and P3 represent CellPower 1/2/3.

As shown in FIG. 4, the downlink receiver, according to an embodiment of the present invention, performs iterative interference cancellation, chip level equalization, and equalization coefficient update. For this purpose, the downlink receiver compares the power values of the channel estimation vectors measured per cell to sort out and configures the number of cells to join the iterative interference cancellation process (Ncell) and the maximum number of iterations (IterMax).

In this state, the downlink receiver performs OVSF despreading through descrambling and Inverse Fast Hadamard Transform (IFHT) on the received samples of the selected cell to generates the symbol observation value per channel. After measuring the code and noise powers per code channel among the per-channel symbol observation values, the MMSE symbol estimation is performed on the code channel symbols of the data channel. The per-code channel MMSE symbol estimation values are OVSF-spread again, summed, multiplied with the scrambling code of the cell, and FIR filtered (convolution) with the channel estimation vector so as to regenerate the received chip samples of the cell. The regenerated samples are buffered in the regeneration buffer of the corresponding cell k. As described above, the downlink receiver generate the symbol observation value of the selected cell k, estimates chip level MMSE from the symbol observation value, and estimates the chip (or half-chip) level of the received signal to generate the regeneration sample.

The downlink receiver calculates the chip equalization coefficient of cell i in consideration of the situation in which the interfering cells are removed. That is, once the code channel power is estimated per discovered code channel of the cell, the downlink receiver updates the received signal power and beta information power per cell. The downlink receiver calculates and updates the chip equalization coefficient (EQ weight) in consideration of the received signal power of the interfering cells based on such information (beta information and per-cell channel estimation information).

The regeneration samples are generated by removing the cell interference component from the received samples. That is, the downlink receiver performs chip level equalization on the received sample from which the interference is canceled by the update equalization coefficient while removing the samples of the interfering cell excluding cell i from the received samples.

The above-described operations are performed on Ncell cells such that, if interference cancellation, equalization, and equalization coefficient update operations have not yet been performed on the $N^{th}$ cell, the same operations are performed repeatedly after incrementing the number of iterations by one. Otherwise, if the interference cancellation, equalization, and equalization coefficient update operations are performed to the $N^{th}$ cell, the downlink receiver stops the iterative interference cancellation process and performs normal operations for the HS-DSCH (descrambling, OVSF dispreading, etc., channel coding).

Figure 6:
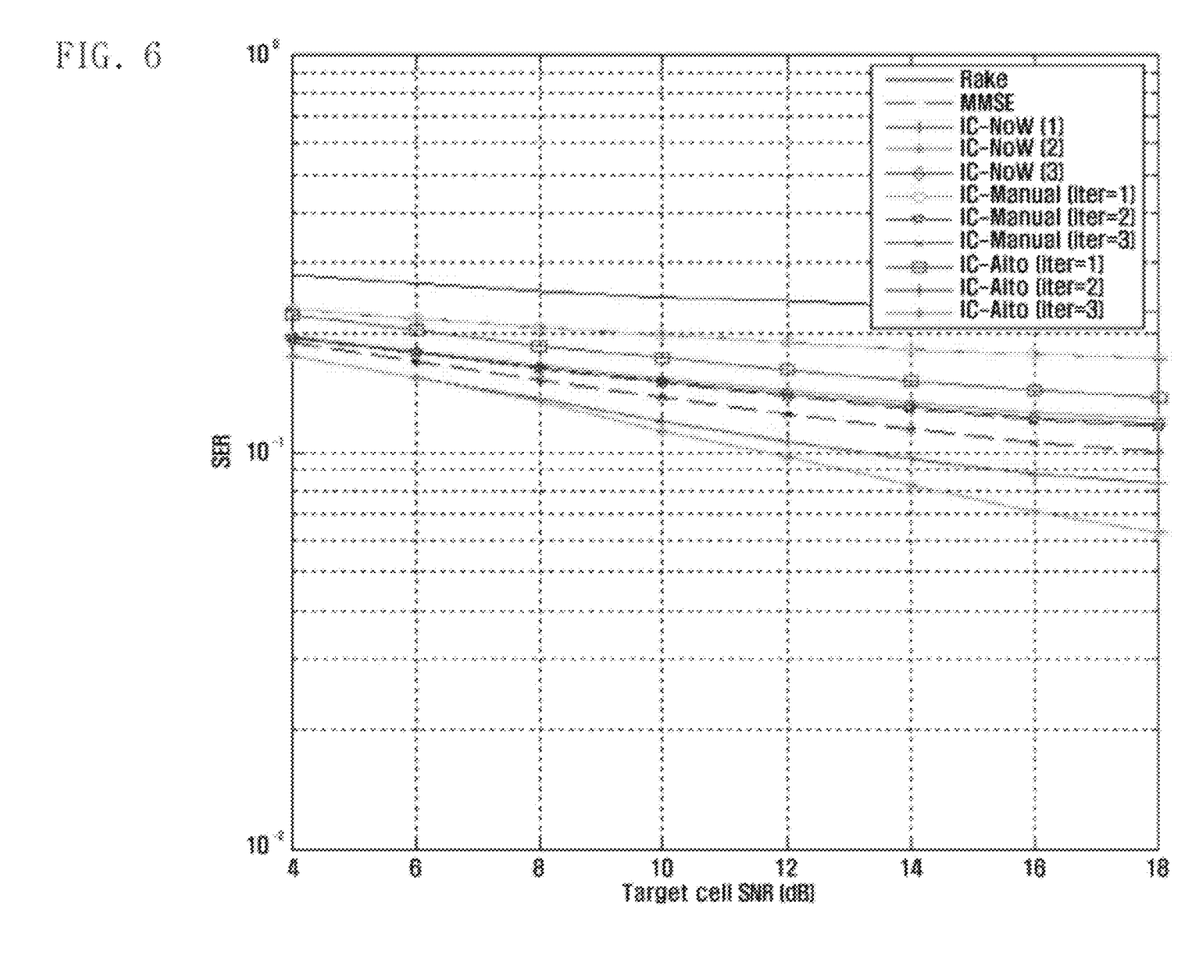
FIG. 6 is a graph illustrating the performance simulation result of the equalizer for iterative interference cancellation according to an embodiment of the present invention.

The iterative interference cancellation process, as described above, accomplishes performance improvement as shown in FIG. 6. FIG. 6 is a graph illustrating the performance simulation result of the equalizer for iterative interference cancellation according to an embodiment of the present invention. In FIG. 6, Ncell=2, NoW=No weight update, Manual=manual weight update, and Auto=Automatic Weight update. The property indicated by Auto in FIG. 6 shows the interference-canceled equalization characteristic of the downlink receiver according to an embodiment of the present invention.

Typically, the chip level equalizer (Type2i/Type3i) is limited in performance improvement because its interference-aware MMSE receiver can just be aware of and suppress the interferences of neighbor cells in the chip level equalization coefficient update process of the serving cell based on the channel estimation values of the interfering cells. In the present invention, the chip level equalizer (Type2i/Type3i) is provided with the least amount of hardware devices (high speed chip equalization coefficient filter, cell descrambler, OVSF despreader (IFHT), symbol level MMSE estimator, OVSF spreader (Fast Hadamard Transform (FHT)), cell scrambler, channel estimation value and FIR filter, and per-cell received sample regeneration buffers) to remove the samples of the interfering cells directly and update the chip level equalization coefficient in consideration of the interference cancellation, resulting in an improvement of reception SINR of the desired serving cell. Accordingly, the reception modem equipped with such a chip level equalizer can reuse the channel equalization devices (channel estimator, chip level equalization coefficient calculator, and chip equalization filter) as much as possible and reinforce the modem competitiveness with a high performance iterative interference canceller and chip equalizer.

The embodiments described above in the specification and the accompanying drawings are provided to facilitate understanding of the subject matter of the present invention, but not intended to limit the scope of the present invention. Accordingly, it would be clear to those skilled in the art that various changes and modifications may be made without departing from the spirit and scope of the claims and their equivalents.

What is claimed is:

1. A downlink receiver in a mobile communication system, comprising:
   a channel estimator for estimating channel impulse response of a selected cell from channel signals of respective cells;
   an equalizer for equalizing an output of the channel impulse response by the channel estimator using an equalization coefficient;
   a despreader for generating a symbol observation value, per code channel by despreading an output of the equalizer with a code of the selected cell;
   a cell interference estimator for estimating a symbol signal power and noise power of a data code channel from the symbol observation value and generating an estimated Minimum Mean Square Error (MMSE) as a chip level regeneration sample; and
   an interference canceler connected between an input node of the downlink receiver and the equalizer, for buffering the output of the cell interference estimator to a regeneration sample buffer of the selected cell, subtracting a sum of regeneration samples of interfering cells from an input sample signal to remove interference, and inputting a result of the subtraction to the equalizer.

2. The downlink receiver of claim 1, further comprising:
   a signal processor for updating the equalization coefficient, the signal processor summing gain information of code channels generated by the cell interference estimator to estimate transmission power of the currently selected cell and transferring the transmission power to the equalizer to update the equalization coefficient.

3. The downlink receiver of claim 2, further comprising:
   an interference cancelation controller for configuring a number of cells to join the interference cancelation and a predetermined number of iterations of interference cancelation, and controlling the channel equalizer, a despreader, the cell interference estimator, and the interference canceler to select the cells of which interferences are canceled in series, and performing interference cancelation operations on all the cells for the predetermined number of iterations.

4. The downlink receiver of claim 2, wherein the cell interference estimator comprises:
- a symbol estimator for receiving a demodulation symbol observation value per code channel from the despreader and estimating received signal power and noise power of the demodulation symbol observation value to output the MMSE estimation value; and
- a regeneration sample generator for spreading the output of the symbol estimator with the code of the selected cell and generating the chip level regeneration sample.

5. The downlink receiver of claim 4, wherein the symbol estimator comprises:
- a Common Pilot CHannel (CPICH) symbol estimator for estimating the noise power from a pilot symbol observation value of the demodulation symbol;
- a code symbol estimator for estimating signal power and noise power per data code channel using the pilot symbol observation value of the demodulation symbol and the output of the CPICH symbol estimator; and
- an MMSE symbol estimator for performing Linear Minimum Mean Square Error (LMMSE) symbol estimation on a modulation symbol output from the code symbol estimator.

6. The downlink receiver of claim 5, wherein the regeneration sample generator comprises:
- a spreader for spreading the output of the code symbol estimator with the code of the selected cell; and
- a filter for generating regeneration samples of the channel estimated by FIR-filtering the output of the spreader.

7. The downlink receiver of claim 4, wherein the interference canceler comprises:
- a number of regeneration sample buffers for as many as a number of cells;
- a first selector for selecting one of the regeneration sample buffers to buffer the regeneration samples of the selected cell that are output by the regeneration sample generator;
- a second selector for selecting the regeneration samples of the interfering cells that are output by the regeneration sample buffers;
- an adder for adding the regeneration samples output by the second selector; and
- a subtractor for subtracting output of the adder from the input received sample signals to remove interference and transfers the subtraction result to the equalizer.

8. A cell interference cancelation method of a downlink receiver in a mobile communication system, the method comprising:
- estimating a channel impulse response of a cell selected from channel signals of respective cells;
- equalizing, by an equalizer, the channel impulse response with an equalization coefficient;
- despreading the output of the equalizer with a code of the selected cell to generate a symbol observation value per code channel;
- estimating a symbol level Minimum Mean Square Error (MMSE) by measuring symbol signal power and noise power of a data code channel from the symbol observation value to generate the estimated MMSE as a chip level regeneration sample; and
- canceling interference by buffering a cell interference estimation result to a regeneration sample buffer of a corresponding cell, subtracting a sum of regeneration samples of interfering cells from an input sample signal to cancel interference, and transferring a result of the subtraction for equalization.

9. The cell interference cancelation method of claim 8, further comprising:
- updating the equalization coefficient, by summing gain information of code channels which is generated by a cell interference estimator to estimate transmission power of the currently selected cell and transferring the transmission power to the equalizer to update the equalization coefficient.

10. The cell interference cancelation method of claim 9, wherein estimating comprises:
- generating an MMSE symbol estimation value by receiving a demodulation symbol observation value per code channel and estimating received signal power and noise power of the demodulation symbol observation value; and
- generating the chip level regeneration sample by spreading the MMSE symbol estimation value with a code of the selected cell.

11. The cell interference cancelation method of claim 10, wherein generating the MMSE symbol estimation value comprises:
- estimating a Common Pilot CHannel (CPICH) symbol by estimating the noise power from a pilot symbol observation value of the demodulation symbol;
- estimating a code symbol by estimating signal power and noise power per data code channel using the observation value of the demodulation symbol and the CPICH symbol; and
- estimating the MMSE symbol by performing Linear Minimum Mean Square Error (LMMSE) symbol estimation on the modulation symbol from the estimated code symbol.

12. The cell interference cancelation method of claim 11, wherein generating the chip level regeneration sample comprises:
- spreading the estimated code symbol with the code of the selected cell; and
- and generating regeneration samples of the channel estimated by FIR-filtering the spreading result.

13. The cell interference cancelation method of claim 10, wherein canceling comprises:
- selecting one of regeneration sample buffers to buffer the regeneration samples of the selected cell;
- selecting the regeneration samples of the interfering cells that are output by the regeneration sample buffers;
- adding the regeneration samples of the interfering cells; and
- subtracting the sum of the regeneration samples from the input received samples to remove interference and output the subtraction result for equalization.

* * * * *